United States Patent Office 3,251,877
Patented May 17, 1966

3,251,877
NITRATION OF TOBIAS ACID AND PREPARATION OF 8-NITRO-2-NAPHTHYLAMINE
Donald C. Morrison, Berkeley, Calif., assignor to Fundamental Research Company, Berkeley, Calif., a partnership
No Drawing. Filed Feb. 1, 1963, Ser. No. 255,688
4 Claims. (Cl. 260—508)

This application is a continuation in part of my copending application, Serial No. 1,430, filed January 11, 1960, and now abandoned.

The subject inventions relate to the nitration of certain naphthalene derivatives, the separation of these nitrated naphthalene derivatives, and to the preparation from these derivatives of a further derivative. The subject inventions are directed more particularly to the controlled nitration of Tobias acid (2-amino-1-naphthalene sulfonic acid) and to the nitro-amines which result when the nitrated sulfonic acids are hydrolyzed. More specifically, the subject inventions relate to the nitration of Tobias acid, to the obtaining of a mixture of the 8-nitro and 5-nitro isomers of Tobias acid, to a method of separating the components of this mixture, and to the preparation from the 8-nitro isomer of Tobias acid of 8-nitro-2-naphthylamine.

The principal object of the subject inventions is the provision of a novel process for producing 8-nitro-2-naphthylamine. This compound serves as a valuable source for the making of another dyestuff intermediate, the latter being 8-amino-2-naphthol. 8-amino-2-naphthol is an essential ingredient in the production of a valuable black dyestuff having outstanding properties. The present method for producing 8-amino-2-naphthol involves the nitration and subsequent reduction of 2-naphthalene-sulfonic acid to produce a mixture consisting of approximately fifty percent each of 1,6- and 1,7-Cleve's acids. The separation of these isomers is difficult, and when this separation is accomplished the 1,7-isomer is fused with caustic potash to give the desired 8-amino-2-naphthol. The overall yield of this intermediate, 8-amino-2-naphthol, based on naphthalene, is about twenty-five percent. The concomitant 1,6-Cleve's acid finds comparatively little use, with the result that it builds up in volume as an undesired by-product.

The subject method of nitrating Tobias acid produces the desired 1,7- (8,2-) isomer configuration in seventy-five–eighty-five percent yield, as compared to the 1,6- (5,2-) isomer which is produced in fifteen–twenty-five percent yield.

The 8-nitro-2-naphthylamine, obtained by the subject method of nitrating Tobias acid followed by a novel process of hydrolyzing the 8-nitro- isomer of Tobias acid and thereby enabling its separation from the 5-nitro isomer of Tobias acid, is diazotized to give 8-nitro-2-naphthol, the latter being in turn reduced to the desired 8-amino-2-naphthol.

Additionally, however, the minor by-product, 5-nitro Tobias acid, can be used to prepare nitro Lithol Red pigments of outstanding tinctorial power. Thus, the by-product problem which is involved in the above-described present method for preparing 8-amino-2-naphthol is largely overcome by the subject process for preparing 8-nitro-2-naphthylamine.

Other objects of the subject inventions are the following: a process for the mononitration of Tobias acid; mononitrated Tobias acid; 5-nitro Tobias acid; and the preparation from 8-nitro Tobias acid of 8-nitro-2-naphthylamine.

These and other objects of the invention and their accomplishment will become apparent on the further reading of this specification and the claims.

As is well known, it is difficult to nitrate aminonaphthalene compounds directly, since the amino group is very sensitive to oxidizing agents and is often destroyed by them. Convincing evidence of this difficulty is the fact that the chemical and patent literature offers no example of the successful nitration of Tobias acid, although this intermediate has been a commercial chemical for over 60 years.

I have now found that Tobias acid may be mononitrated and in good yield in the 5- and 8- positions if the nitration is carried out in a concentrated sulfuric acid medium and at temperatures which must not appreciably exceed 0° C. The resulting product is a mixture of 5- and 8-nitro-2-amino-1-naphthalene sulfonic acids. Lower temperatures favor the preponderance of the 8-nitro isomer; at −10 to −15° C., this isomer predominates to the extent of about 80 percent as compared with about 20 percent of the 5-isomer.

Maintenance of a low temperature not appreciably exceeding 0° C. in the reaction mixture is a critical and determining factor, as at temperatures above 0° C. very poor yields are obtained, and a large quantity of dark brown amorphous material is formed.

My preferred nitrating procedure is to dissolve or disperse the Tobias acid in an excess of concentrated (96 percent) sulfuric acid and add solid potassium or sodium nitrate incrementally. Alternatively, however, concentrated (70 percent) nitric acid may be employed in place of a nitrate. Exemplification of my preferred procedure is given below, for purposes of illustration but not of limitation.

*Example I*

11.15 parts by weight of Tobias acid were dispersed in 220 parts of 96 percent sulfonic acid cooled to −5° C. The mixture was stirred (most of the Tobias acid dissolved) and, while maintaining an internal temperature of −7 to −1° C., 5.2 parts of solid potassium nitrate were gradually added over a twenty minute period. This reaction mixture was stirred 45 minutes at the same temperature and then poured onto an excess (e.g., 500 parts) of ice. The precipitate was filtered off and stirred with sufficient cold sodium carbonate or other soluble alkali solution to dissolve the precipitated acid. The resulting solution was filtered, and the filtrate cooled in ice and acidified with concentrated hydrochloric acid. This acidification produced a crystalline precipitate of nitrated Tobias acid which was filtered, washed in ice water, and dried. The yield of dried product was 12.85 parts of nitrated Tobias acid, or slightly more than 96 percent based on the weight of Tobias acid used in the nitration: infra-red spectroscopic examination showed that the product was a mixture of 5- and 8-nitro-2-amino-1-naphthalene sulfonic acids, the latter predominating.

*Example II*

The procedure employed in Example I was followed throughout except that the temperature of the nitration mixture was maintained at about −15° C. and all accessory processing was carried out at temperatures well below room temperature. The product obtained was similar in appearance to that in Example I, except that it was somewhat lighter in color. Infra-red spectroscopic examination showed this product to consist of at least 80 percent 8-nitro-2-amino-1-naphthalene sulfonic acid and at most 20 percent of the 5- isomer.

The dried products of Examples I and II may be treated along the lines of the procedures of Examples IV and V, i.e., the addition of a mineral acid to these products at about room temperature conditions results in the hydrolysis of the 8-nitro isomer to form 8-nitro-2-naphthylamine, the latter separating spontaneously from the hydrolysis solution in the form of its mineral acid salt.

The nitrated Tobias acids of my invention may be used in the arts as modified Tobias acids or as intermediates for the preparation of other desired organic compounds. For such purposes the mixture of nitrated Tobias acids may be employed without separating the component nitrated Tobias acids. Thus, for example, the nitrated Tobias acids may be readily desulfonated as, for example, by heating for ten minutes, more or less, with 70–80 percent sulfuric acid to form nitro-naphthylamines, in particular 8-nitro-2-naphthylamine and 5-nitro-2-naphthylamine. These nitro-naphthylamines may be desired for example, as intermediates in the production of 1,6- and 1,7-diamino naphthalenes for use in turn in the production of their respective isocyanates as raw materials in polyurethane resin manufacture. All previous routes for the preparation of these nitro-2-naphthylamines involve the use of the carcinogenic beta-naphthylamine as starting material, whereas the process of my invention employs the presumably non-toxic Tobias acid. The typical yield obtained in previous methods of preparation of 8-nitro-2-naphthylamine is fifty percent, based on the starting material; in the process of the instant invention yields of at least eighty percent may be obtained.

The readiness with which nitrated Tobias acid may be desulfonated to form the nitronaphthylamine is illustrated in Example III below.

*Example III*

Nitrated Tobias acid prepared in accordance with Example I or II above is placed in an excess of 70–80 percent sulfuric acid and heated at 125–135° C. for ten minutes. The mixture is then cooled, poured onto ice water and made alkaline with soda ash or caustic soda. The precipitated nitro amine is filtered, washed and dried. The product is a mixture of 8- and 5-nitro-2-naphthylamines if the product of Example I is used as the starting material, the proportion of 8-nitro-2-naphthylamine being at least eighty percent if the product of Example II is thus employed.

A mixture of 8- and 5-nitro-2-naphthylamine can be readily separated into its components. For example a single recrystallization from aqueous methanol eliminates essentially all of the 5- isomer. Subsequent recrystallization of the 8- isomer thus obtained as from aqueous methanol and from benzene-hexane, produces the 8- isomer in pure form.

The nitrated Tobias acids can also be diazotized and coupled to form dyestuffs. For example, the diazo salts may be coupled with beta-naphthol to form red dyestuffs analogous to Lithol Red; they may also be coupled with R Salt to form red dyes.

The subject inventions further include a process for selectively hydrolyzing the 8-nitro isomer of Tobias acid and thereby enabling its separation in a neat, clean and economical manner from the 5-nitro isomer of Tobias acid. This separation process is illustrated by the following examples.

*Example IV*

1685 grams of 96 percent sulfuric acid were cooled to −5° to 0°, and, while stirring, 89.2 grams of Tobias acid was added during an approximate ten minute period. This mixture was stirred for an approximate fifteen minute period while being maintained within the aforesaid temperature range, and the mixture was then cooled to −15 to −20° C. 40.4 grams of potassium nitrate (finely ground) were then added during an approximate fifteen minute period while the mixture was maintained within the last-mentioned temperature range. The resulting mixture was then stirred for about one hour at −10° to −20° and it was then allowed to warm up to room temperature (20–25°) during approximately one hour. After stirring at room temperature for about six hours (3–8 hours is satisfactory), the mixture was poured with stirring onto five kilograms of ice. After having been allowed to warm up to 20°, the then resulting mixture was saturated with sodium chloride and left over night. The mixture was then filtered and the filtrate was discarded. The solids obtained upon filtration contain a mixture of the sulfate and chloride of 8-nitro-2-naphthylamine together with 5-nitro Tobias acid. The latter was dissolved by stirring for about four hours with an excess of dilute sodium hydroxide. After filtering, the insoluble 8-nitro-2-naphthylamine was washed and dried. Its yield was 54.9 grams. The 8-nitro-2-naphthylamine so produced was indicated by infrared spectroscopic examination to be pure. The alkaline filtrate and washings were then acidified with dilute hydrochloric acid and the resulting mixture was cooled on ice for several hours. 5-nitro Tobias acid crystallized out, was filtered off, washed with water, and then dried. The resulting yield of 5-nitro-Tobias acid was 24.3 grams. 0.38 mole of end products (0.29 mole of 8-nitro-2-naphthylamine and 0.09 mole of 5-nitro Tobias acid) were thus obtained from 0.40 mole (89.2 grams) of Tobias acid used as a starting material.

The 5-nitro Tobias acid appears to be more stable to desulfonation than Tobias acid itself and this is probably true of its derivatives also. It has been demonstrated that the 5-nitro Tobias acid can be diazotized by customary procedures and that the diazo compound will couple with both beta-naphthol and BON acid. The beta-naphthol coupling product provides a more stable analogue of Lithol Red. It has been used to dye wool.

If desired, the pure 5-nitro Tobias acid may be desulfonated to 5-nitro 2-naphthylamine, as, for example, by the following procedure:

5 grams of the nitro Tobias acid was stirred and heated under reflux (125° C.) for three hours with 50 ml. of 50% sulfuric acid. The solution was cooled to about room temperature, diluted with 200 ml. of water and filtered. The filtrate was made alkaline with sodium hydroxide and the precipitated 5-nitro-2-naphthylamine filtered off, washed and dried.

*Example V*

870 grams of 96 percent of sufuric acid were cooled to −5° and treated with stirring with 44.6 grams of Tobias acid. After stirring for an approximate period of twenty minutes, the solution was cooled to −15° to −20°. A mixture of 50 grams of 96 percent sulfuric acid and 17.9 parts of 70 percent nitric acid was then added during an approximate period of twenty minutes while the solution was maintained in the last-mentioned temperature range. The solution was stirred for about one hour at this temperature and was then allowed to warm up to 20°–25° during about one hour. After stirring for about three hours at 25° C., the solution was poured onto three kilograms of ice. The resulting mixture was then worked up in accordance with the procedure set forth in Example IV, i.e., by salting out and by subsequent resolution by alkali. The yield of 8-nitro-2-naphthylamine was 27.1 grams (0.14 mole) and the yield of 5-nitro Tobias acid was 13.2 grams (0.05 mole). As in Example IV, the 8-nitro-2-naphthylamine was indicated to be pure by infra-red spectroscopic examination.

The above disclosed subject inventions may be modified within the skill of the art. Thus, for example, the sodium carbonate used to dissolve the nitrated Tobias acid, when first precipitated, may be replaced by other soluble alkalis, such as potassium carbonate or sodium or potassium hydroxide. Similarly, the hydrochloric acid used in the acidification of the alkaline sulfonate solution may be replaced by other acids.

I claim:

1. A process for the preparation of relatively pure 8-nitro-2-naphthylamine comprising:
   (1) nitrating 2-amino-1-naphthalene sulfonic acid at −10 to −20° C. in a sulfuric acid medium,
   (2) raising the temperature of the resultant reaction mixture to about room temperature and maintaining said temperature for at least three hours, (3) adding said reaction mixture to an excess of ice and thereafter raising the temperature thereof to about room temperature,
(4) salting out said mixture, filtering the solids therefrom, and adding to said solids an excess of a dilute aqueous solution of alkali, and
(5) filtering said solution and recovering the 8-nitro-2-naphthylamine as residue.

2. A process for the preparation of relatively pure 5-nitro-2-amino-1-naphthalene sulfonic acid comprising:
(1) mononitrating 2-amino-1-naphthalene sulfonic acid at −10 to −20° C. in a sulfuric acid medium,
(2) raising the temperature of the resultant reaction mixture to about room temperature and maintaining said temperature for at least three hours,
(3) adding said recation mixture to an excess of ice and thereafter raising the temperature thereof to about room temperature,
(4) salting out said mixture, filtering the solids therefrom, and adding to said solids an excess of a dilute aqueous solution of alkali,
(5) filtering said solution and acidifying the filtrate, and
(6) cooling said acidified filtrate and recovering crystallized 5-nitro-2-amino-1-naphthalene sulfonic acid.

3. A process for the preparation of 8-nitro-2-naphthylamine from a mixture of 5-nitro-2-amino-1-naphthalene sulfonic acid and 8-nitro-2-amino-1-naphthalene sulfonic acid comprising:
(1) hydrolyzing the 8-nitro-2-amino-1-naphthalene sulfonic acid constituent of said mixture to 8-nitro-2-naphthylamine by adding said mixture to a medium of mineral acid and maintaining the mixture-acid dispersion at about room temperature for a period of time to enable completion of the hydrolysis,
(2) filtering the solids from said mixture-acid dispersion,
(3) adding to said solids an excess of dilute aqueous solution of alkali, and
(4) filtering said solution and recovering the 8-nitro-2-naphthylamine as residue.

4. A process for the separation of 5-nitro-2-amino-1-naphthalene sulfonic acid from a mixture of 5-nitro-2-amine-1-naphthalene sulfonic acid and 8-nitro-2-amino-1-naphthalene sulfonic acid comprising:
(1) hydrolyzing the 8-nitro-2-amina-1-naphthalene sulfonic acid constituent of said mixture to 8-nitro-2-naphthylamine by adding said mixture to a medium of mineral acid and maintaining the mixture-acid dispersion at about room temperature for a period of time to enable completion of the hydrolysis,
(2) filtering the solids from said mixture-acid dispersion,
(3) adding to said solids an excess of dilute aqueous solution of alkali,
(4) filtering said solution and acidifying the filtrate, and
(5) cooling said acidified filtrate and recovering crystallized 5-nitro-2-amino-1-naphthalene sulfonic acid.

References Cited by the Examiner

UNITED STATES PATENTS

| | | | |
|---|---|---|---|
| 1,836,211 | 12/1931 | Weiland et al. | 260—578 |
| 1,912,639 | 6/1933 | Hitch et al. | 260—508 |
| 2,501,831 | 3/1950 | Seymour et al. | 260—578 |
| 2,576,807 | 11/1951 | Oesterlein | 260—508 |
| 2,763,690 | 9/1956 | Hagenboecker et al. | 260—578 |
| 2,867,613 | 1/1959 | Spencer | 260—508 X |

FOREIGN PATENTS

| | | |
|---|---|---|
| 57,023 | 5/1891 | Germany. |
| 73,502 | 2/1894 | Germany. |
| 74,688 | 4/1894 | Germany. |

OTHER REFERENCES

Morrison et al., J. Org. Chem., vol. 27, 1962, p. 3336, QD 241 J6.

LORRAINE A. WEINBERGER, *Primary Examiner.*

LEON ZITVER, *Examiner.*

B. EISEN, M. WEBSTER, *Assistant Examiners.*